(12) United States Patent
Tonkinson (10) Patent No.: US 8,886,964 B1
(45) Date of Patent: Nov. 11, 2014

(54) PROTECTING REMOTE ASSET AGAINST DATA EXPLOITS UTILIZING AN EMBEDDED KEY GENERATOR

(71) Applicant: Flexera Software LLC, Itasca (IL)

(72) Inventor: Charles Tonkinson, Henley-on-Thames (GB)

(73) Assignee: Flexera Software LLC, Itasca, IL (US)

( * ) Notice: Subject to any disclaimer, the term of this patent is extended or adjusted under 35 U.S.C. 154(b) by 0 days.

(21) Appl. No.: 14/261,026

(22) Filed: Apr. 24, 2014

(51) Int. Cl.
*H04L 29/06* (2006.01)
*G06F 21/62* (2013.01)
*G06F 21/60* (2013.01)

(52) U.S. Cl.
CPC .......... *G06F 21/6272* (2013.01); *G06F 21/602* (2013.01)
USPC ....................................... 713/193

(58) Field of Classification Search
None
See application file for complete search history.

(56) References Cited

U.S. PATENT DOCUMENTS

| 6,477,649 | B2 * | 11/2002 | Kambayashi et al. | 726/27 |
| 8,139,766 | B2 * | 3/2012 | Koseki et al. | 380/30 |
| 2007/0276760 | A1 * | 11/2007 | Kanehara et al. | 705/59 |
| 2008/0010449 | A1 * | 1/2008 | Holtzman et al. | 713/157 |
| 2010/0017599 | A1 * | 1/2010 | Sellars et al. | 713/156 |
| 2013/0036160 | A1 * | 2/2013 | Sasao et al. | 709/203 |
| 2013/0283393 | A1 * | 10/2013 | Hierro et al. | 726/27 |

* cited by examiner

*Primary Examiner* — Benjamin Lanier
(74) *Attorney, Agent, or Firm* — Michael A. Glenn; Perkins Coie LLP (57) ABSTRACT

Some embodiments include a method of using different keys from an embedded key generator for each update of a trusted storage to mitigate common user-based exploits (clone, restore, tamper) of the trusted storage. The method includes: retrieving a key generator certificate from the key generator; requesting the key generator to generate a key associated with a key authenticator and to return a key handle associated with the key; generating a request to the key generator, the request including the key handle, the key authenticator, and a record to be maintained in the trusted storage; and in response to receiving an encrypted record from the key generator, storing the encrypted record associated with the first key handle and an authenticator generation formula in the trusted storage in a computing device, wherein the encrypted record is encrypted via the above key.

20 Claims, 7 Drawing Sheets

PROTECTING REMOTE ASSET AGAINST DATA EXPLOITS UTILIZING AN EMBEDDED KEY GENERATOR

RELATED FIELD

At least one embodiment of this disclosure relates generally to security systems, and in particular, methods and systems to detect or prevent exploitation of remote assets in a trusted storage in a local computing device.

BACKGROUND

There is an ever-increasing demand for security in the current digital age. In particular, companies, such as software licensors, regard the protection of trusted storages as an important priority. A trusted storage stores and protects remote data assets on behalf of the companies on local computing devices. For example, avoiding exploitation (e.g., by the end-users) of software licenses on a consumer computer can recover lost profits for a software licensor. However, exploit methodologies vary, and thus it has been difficult to identify a methodology that protects against multiple forms of digital exploitations.

SUMMARY

Private entities, particularly commercial entities, may sometimes need to have data securely stored across computing devices outside of the entities' control. These private entities can utilize an external server acting as a "principal server" that communicates with an "agent application" to assert some influence over the computing devices to prevent unauthorized access to the storage spaces, e.g., tampering, cloning, restoring, etc. Because the computing devices are not under direct control of the private entities, storage spaces in the computing devices are often considered to exist within hostile environments.

Herein, each storage space with data that a private entity wishes to protect is referred to as a "trusted storage." The integrity of a trusted storage is a primary concern for the private entities. That is, the private entity intends to store data of arbitrary size in a repository in a local computing device, where the repository cannot be created, read, written, restored, or copied by an end-user of the local computing device. The end-user may have an interest to circumvent a computing activity policy configured by the data in the trusted storage or to tamper with evidence of misbehavior reflected in the data. For example, a private entity may want to verify changes to data in a trusted storage via the principal server, such as a global verification server. In order to ensure that the changes to the data are authentic changes, the private entity has an interest to detect and/or prevent cloning of any data, tampering of any data, and restoring of any data within the trusted storage.

Disclosed is a technique that utilizes an embedded key generator to generate and manage separate encryption keys for different versions (e.g., every update can instantiate a version) of a trusted storage. The disclosed technique is at least advantageous in that cryptographic key generation is independent of access to a remote server (e.g., a global licensing server), allowing secure modification of the trusted storage even when offline. The embedded key generator includes a secure cryptography hardware component (e.g., a cryptoprocessor) attached to (e.g., embedded in or attached to) a computing device. The secure cryptography hardware component can be separate from a processor of the computing device that executes the agent application managing the trusted storage. While the embedded key generator is described herein as being an embedded device, other embodiments can include key generators, having the components and modules of the embedded key generator, that is not embedded in the computing device. For example, a key generator can be externally attached to the computing device, such as a key generator with a dongle form factor.

For example, the embedded key generator can be implemented within a Trusted Platform Module (TPM), an embedded hardware in accordance with an international standard. The embedded key generator can also be implemented on a mobile trusted module (MTM). The embedded key generator can be implemented by any other embedded hardware, such as a chip, a controller, a printed circuit board, an application specific integrated circuit, or any combination thereof. The embedded hardware provides an ability to generate encryption keys. The embedded hardware also has a hardware identifier that uniquely identifies itself. This feature enables the embedded key generator to generate a certificate which can be used to sign verification messages to the principal server (e.g., a global verification server), thus ensuring accurate identification of who the principal server is communicating with. The certificate reassures the global verification server that the trusted storage encrypted by the embedded key generator is not subject to a cloning exploit.

In some embodiments where the embedded key generator is implemented using a TPM, the disclosed technique advantageously utilizes the TPM for a different purpose than what the TPM was designed for. A TPM is designed to ensure platform integrity and to secure hardware and data for a end-user of a computing device. Instead of securing data for a user, the agent application can secure "agent data" in a trusted storage for the principal server against exploitation by the end-user of the computing device.

Some embodiments of this disclosure have other aspects, elements, features, and steps in addition to or in place of what is described above. These potential additions and replacements are described throughout the rest of the specification

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
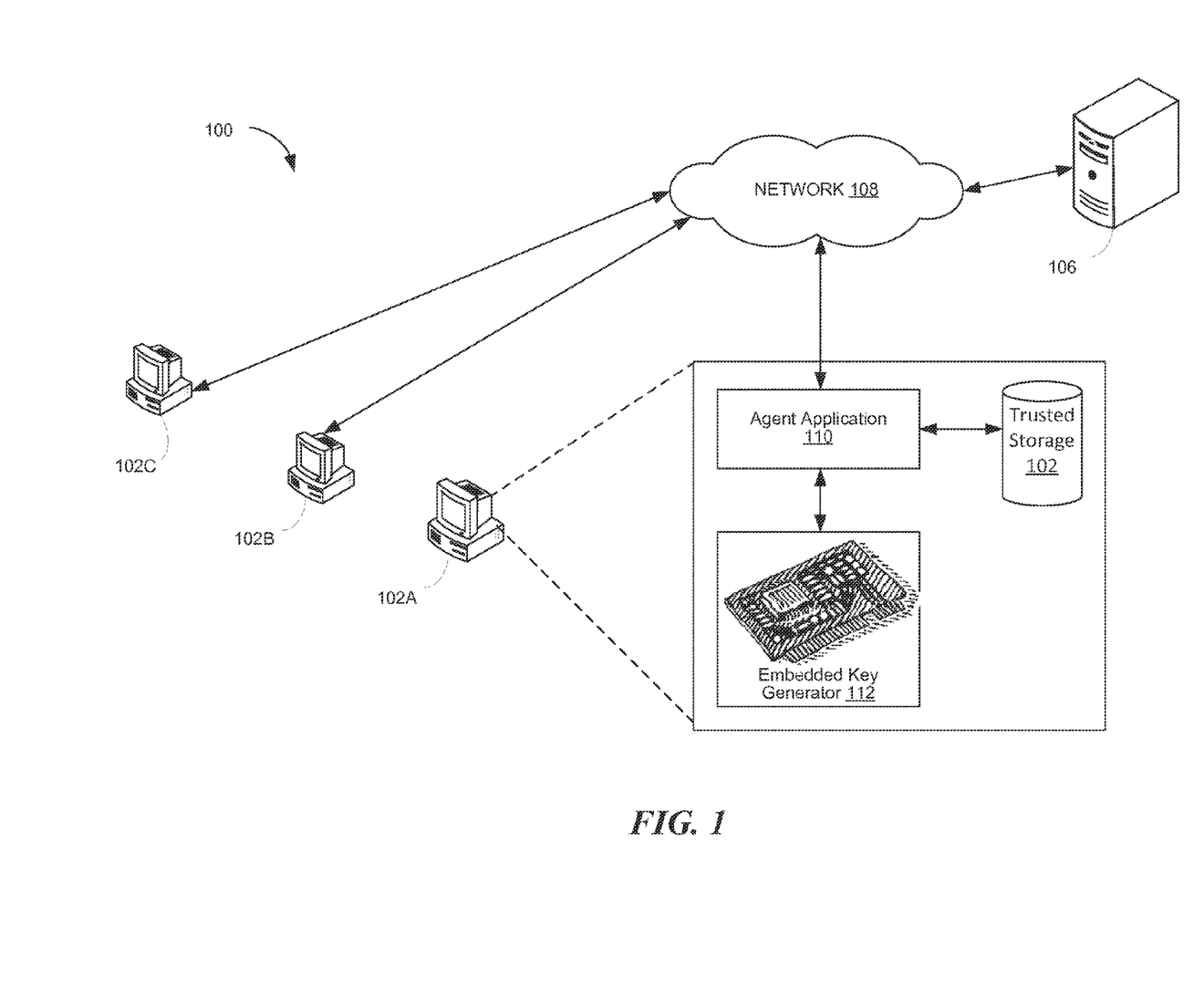
FIG. 1 is a block diagram of a system architecture of a secure storage agent system, in accordance with various embodiments.

FIG. 1 is a block diagram of a system architecture of a secure storage agent system 100, in accordance with various embodiments. The secure storage agent system 100 provides techniques to maintain one or more instances of a trusted storage 102 in one or more computing devices (e.g., a computing device 104A, a computing device 104B, and a computing device 104C, collectively as the "computing devices 104") for a verification server 106. For example, the computing devices 104 can be part of a local network in an enterprise. For another example, the computing devices 104 can be consumer devices (e.g., laptops, computer servers, mobile phones, mobile tablets, mobile computers, desktop computers, etc.) or special purpose devices (e.g., networking equipment, medical devices, machine-to-machine sensors, etc.). The computing devices 104 can be scattered across a network 108, such as the Internet or a local network.

The verification server 106 provides a service to verify and manage instances of the trusted storage 102 across the network 108. The trusted storage 102 is a memory agent storing data in the computing devices 104 for the verification server 106. The trusted storage 102 acts as an agent of the verification server 106 such that only other agents of the verification server 106 are allowed to access (e.g., modify, create, or read) the data therein.

In various embodiments, the trusted storage 102 is managed by an agent application 110. The agent application 110 initiates, facilitates and/or participates in computing activities on the computing device 104A that modify the trusted storage 102. The agent application 110 also provides a service to communicate with the verification server 106, such as providing one or more parameters to the verification server 106 to authenticate the trusted storage 102 and to access data within the trusted storage 102 for the verification server 106.

In accordance with embodiments, the agent application 110 communicates with an embedded key generator 112 to obtain an encryption key to protect a version of the trusted storage 102. For example, the agent application 110 can obtain an encryption key for every version of the trusted storage 102 generated each time the trusted storage 102 is updated.

In one example, the verification server 106 is a global licensing server, where the trusted storage 102 is a local storage of software licenses. In this example, the agent application 110 is a licensing application that enables installation or launching of a software program running on the computing device 102A. In another example, the verification server 106 is a parental control server, where the trusted storage 102 is a local storage of computing activity on a device owned by a minor. In this example, the agent application 110 can be a parental-control-enabled Internet browser that tracks Web browsing activity by the minor. In yet another example, the verification server 106 is an inventory management server, where the trusted storage 102 is a local storage of retail inventory data on a retail merchant's computer. In this example, the agent application 110 can be a point-of-sale application running on the retail merchant's computer, where the point-of-sale application tracks (e.g., deducts or increments) an inventory counter stored in the trusted storage 102.

Other examples of when to use the secure storage agent system 100 include distributed e-commerce systems, compliance monitoring systems, usage monitoring systems (e.g., by Internet service providers, auditing or forensic agencies, regulatory agencies, such as HIPPA, surveillance or intelligence agencies, information technology (IT) departments, web services, etc.), service gatekeepers (e.g., cloud service provider, software vendors, etc.), or any other entities who have interests in storing one or more policies or one or more monitoring agents on local computing devices to remotely control data activities occurring on the local computing devices. For example, the policies can determine which end-user can access what data, services or functionalities, when the access can occur, and how the access can occur. Likewise, the monitoring agents can store which end-users accessed what data, service, or functionalities, when the access occurred, and how the access occurred.

The secure storage agent system 100 enables remote storage of policies and monitoring data that are verifiable by a remote server, such as the verification server 106. The secure storage agent system 100 can protect against several different types of exploits by end-users of the local computing devices targeting the trusted storages in order to circumvent the policies or to avoid detection of misbehaviors evidenced by the monitoring data.

Figure 2:
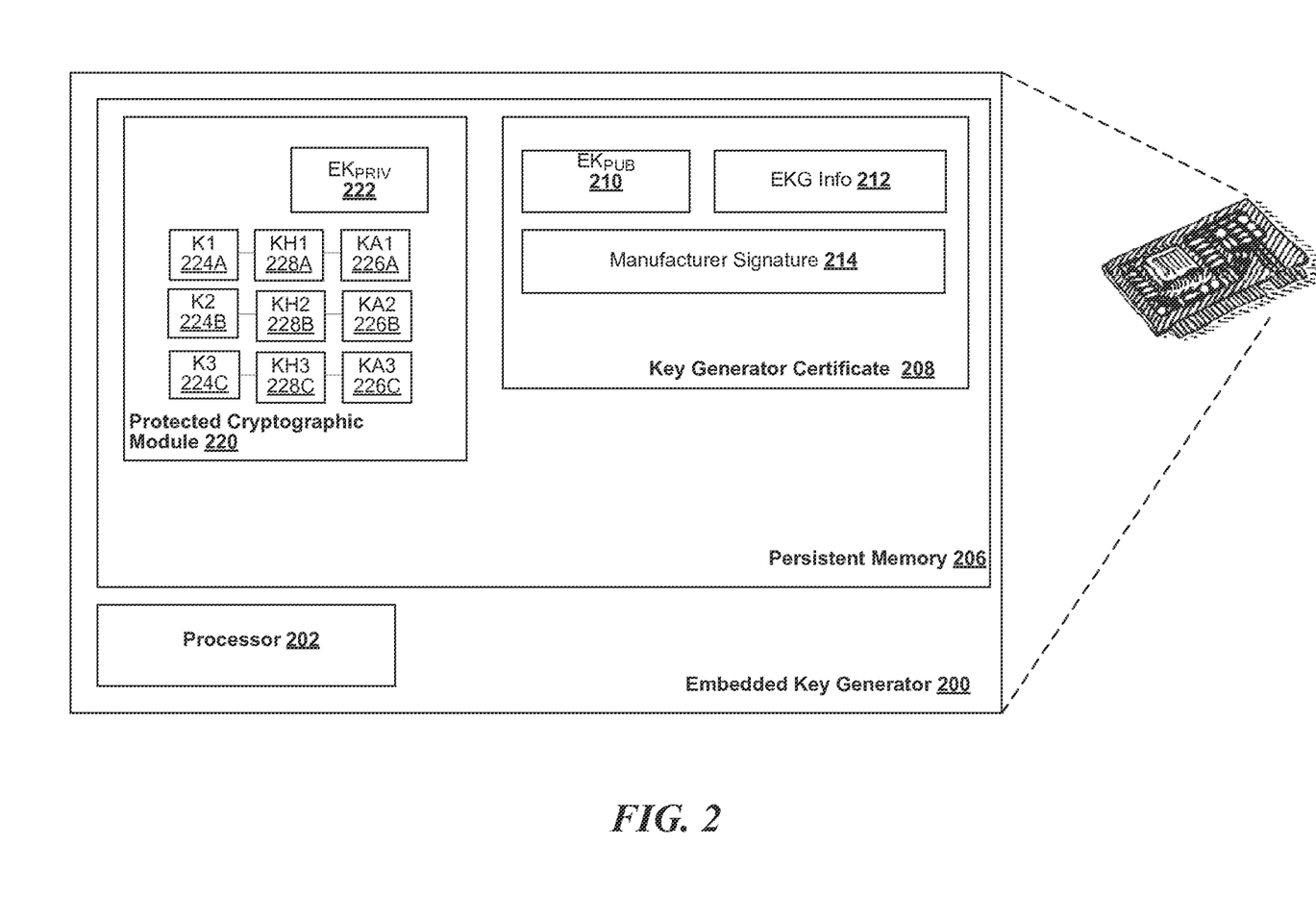
FIG. 2 is a block diagram of an example of an embedded key generator, in accordance with various embodiments.

FIG. 2 is a block diagram of an example of an embedded key generator 200, in accordance with various embodiments. The embedded key generator 200 can be the embedded key generator 112 of FIG. 1. The embedded key generator 200 can be physically attached to an end-user computing device (not shown), such as the computing device 102A of FIG. 1. In some embodiments, the embedded key generator 200 is permanently attached to the end-user computing device (e.g., soldered onto a motherboard of the end-user computing device). In some embodiments, the embedded key generator is a distinct component which is part of the end-user computing device and is designed not to be moved between devices. The embedded key generator 200 includes at least a processor 202 and a persistent memory 206. For example, some modules may be implemented as instructions stored in the persistent memory 206 executable by the processor 202.

The embedded key generator 200 includes a key generator certificate 208. The key generator certificate 208 includes a key generator root public key 210, other key generator information 212, a manufacturer signature 214 of the embedded key generator 200, or any combination thereof. The key generator certificate can be generated during a manufacturing process of the embedded key generator 200 and thus can provide evidence of the provenance of the embedded key generator 200. The key generator certificate 208 cannot be modified once it has been initialized.

The embedded key generator 200 is unique per end-user device (e.g., a physical device or a virtual machine). For example, when an end-user first initializes an end-user device, the end-user device can issue an owner authentication code to the embedded key generator 200 or vice versa. The embedded key generator 200 can save the owner authentication code to later verify that the link between the end-user device and the embedded key generator 200 has not been severed or tampered with. Any client application with access to the owner authentication code can extract the key generator certificate 208 from the embedded key generator 200.

The key generator root public key 210 can uniquely identify the embedded key generator 200 (a different public key is assigned to each instance of embedded key generators during manufacturing). The key generator public key 210 can be certified by the provider or manufacturer of the embedded key generator 200. In embodiments where the embedded key generator is implemented as a TPM, the key generator root public key 210 corresponds to a portion of the Endorsement Key ($EK_{PUB}$) and the key generator certificate 208 corresponds to the Endorsement Key Certificate ($EK_{Cert}$).

The embedded key generator 200 includes a protected cryptographic module 220. The protected cryptographic module 220 can be a standalone hardware circuit (e.g., an application specific integrated circuit, a controller chip, etc.). The protected cryptographic module 220 includes a key generator root private key 222 associated with the key generator root public key 210. The key generator root private key 222 and the key generator root public key 210 can be assigned as a cryptographic asymmetric key pair during the manufacturing process of the embedded key generator 200. The protected cryptographic module 220 enables a client application running on the end-user computing device to isolate encryption operations to be only within the embedded key generator 200. Encryption keys (e.g., symmetric keys or asymmetric key pairs) for these encryption operations are generated by the protected cryptographic module 220. Symmetric keys and private keys from asymmetric key pairs are not released from the embedded key generator 200. Instead, the protected cryptographic module 220 releases key handles that are associated the generated encryption keys to the client application. The encryption keys can be configured to be non-migratable between EKG instances.

The protected cryptographic module 220 can generate one or more encryption keys for one or more applications running on the end-user computing device. The protected cryptographic module 220 can generate any amount of cryptographic keys limited only by the size of the persistent memory 206. For example, the agent application 110 of FIG. 1 (e.g., a requesting application) can request an encryption key from the protected cryptographic module 220. When an encryption key is requested, the protected cryptographic module 220 creates a new key (e.g., a first key 224A). The generated keys are stored in the persistent memory 206. The requesting application can specify a key authenticator (e.g., a first key authenticator 226A) to the protected cryptographic module 220 for any new key to be created. The key authenticator is a credential provided by the requesting application for future use of the created key. In response to the request, the protected cryptographic module 220 generates the new key and a corresponding key handle (e.g., a first key handle 228A), stores the new key associated with the key handle and the key authenticator, and returns the corresponding key handle to the requesting application.

The protected cryptographic module 220 can encrypt and decrypt data upon request. For example, the agent application 110 of FIG. 1 can request encryption of at least a portion of the trusted storage 102 using the first key 224A. The agent application can provide both the first key handle 228A and the first key authenticator 226A to the protected cryptographic module 220. The protected cryptographic module 220 identifies the first encryption key via the first key handle 228A and authenticates the encryption request via the first key authenticator 226A. The protected cryptographic module 220 can then retrieve the first key 224A to encrypt the requested portion. Upon encrypting the requested portion, the encrypted portion is sent back to the agent application.

Likewise, the agent application can send an encrypted portion to the protected cryptographic module 220 along with the first key handle 228A and the first key authenticator 226A. Upon identifying the first key 224A with the first key handle 228A and authenticating the decryption request via the first key authenticator 226A, the protected cryptographic module 220 can decrypt the encrypted portion with the first key 224A. Once decrypted, the protected cryptographic module 220 can return the decrypted portion back to the agent application. In embodiments, cryptographic operations performed by the agent application involving a private or symmetric key occur only within the protected cryptographic module 220.

Regarding FIG. 1 and FIG. 2, portions of components and/or modules associated with the computing device 104A and the embedded key generator 200 may each be implemented in the form of one or more appropriately programmed programmable processors, in the form of special-purpose circuitry, or a combination thereof. The computing device 104A and/or the embedded key generator 200 can include additional, fewer, or different modules for various applications.

For example, the modules described can be implemented as instructions on a tangible storage memory (e.g., the persistent memory 206) capable of being executed by a processor (e.g., the processor 202) or a controller. Tangible storage memory may be volatile or non-volatile memory. In some embodiments, the volatile memory may be considered "non-transitory" in the sense that it is not transitory signal. Modules may be operable when executed by a processor or other computing device, e.g., a single board chip, application specific integrated circuit, a field programmable field array, a network capable computing device, a virtual machine, a distributed operating system, or any combination thereof. Memory spaces and storages described in the figures can be also implemented with tangible storage memory.

Each of the modules and/or components may operate individually and independently of other modules or components. Some or all of the modules may be executed on the same host device or on separate devices. The separate devices can be coupled together through one or more communication channels (e.g., wireless or wired channel) to coordinate their operations. Some or all of the components and/or modules may be combined as one component or module. A single component or module may be divided into sub-modules or sub-components, each sub-module or sub-component performing separate method step or method steps of the single module or component. In some embodiments, at least some of the modules and/or components share access to a memory space. For example, one module or component may access data accessed by or transformed by another module or component. The modules or components may be considered "coupled" to one another if they share a physical connection or a virtual connection, directly or indirectly, allowing data accessed or modified from one module or component to be accessed in another module or component.

Figure 3:
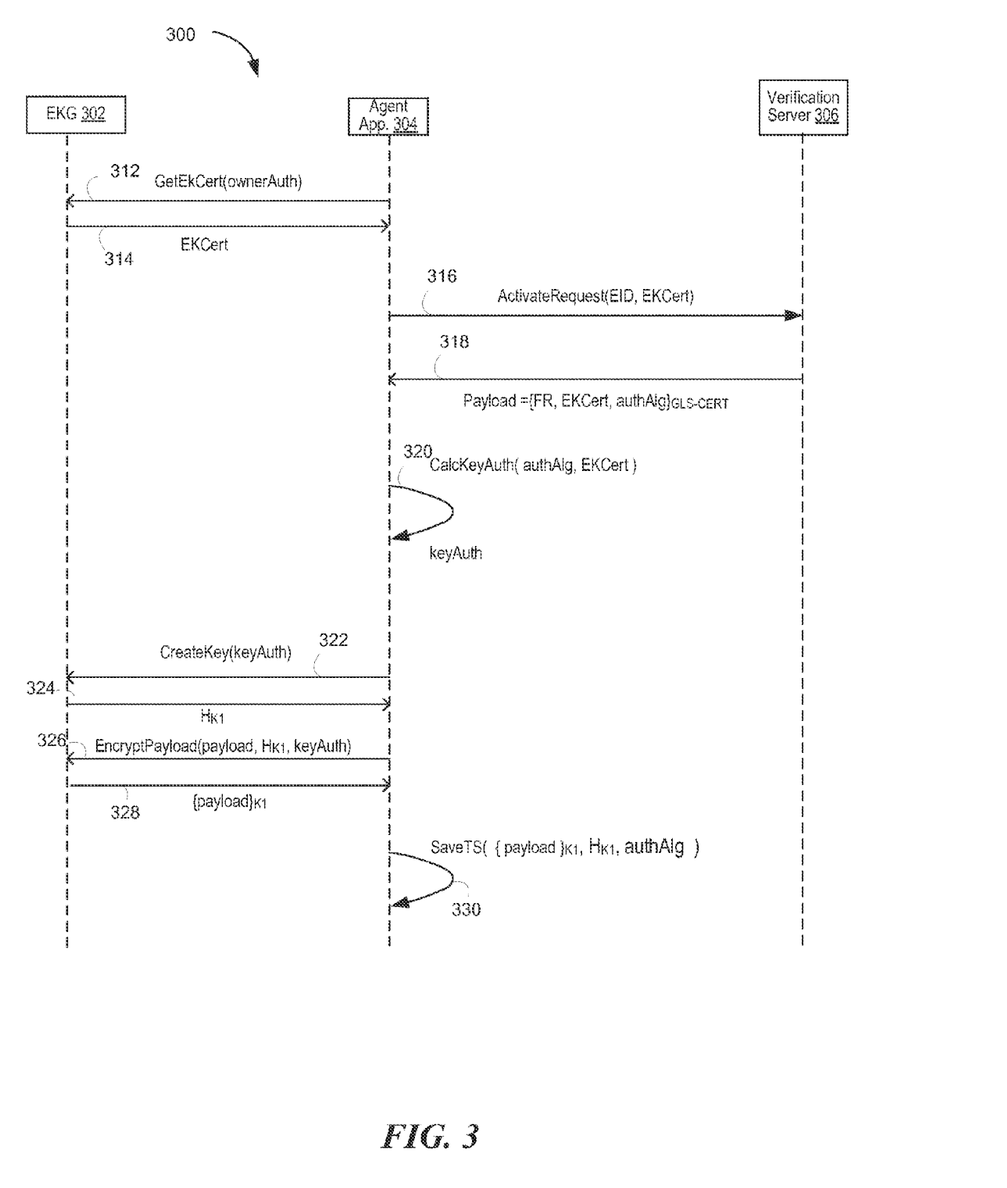
FIG. 3 is an activity diagram illustrating a method of securing a trusted storage in a computing device using an embedded key generator, in accordance with various embodiments.

FIG. 3 is an activity diagram illustrating a method 300 of securing a trusted storage in a computing device using an embedded key generator 302, in accordance with various embodiments. The trusted storage can be the trusted storage 102 of FIG. 1. The computing device can be the computing device 102A of FIG. 1. The method 300 involves the embedded key generator 302 (e.g., the embedded key generator 112 of FIG. 1 or the embedded key generator 200 of FIG. 2) in or attached to the computing device, an agent application 304 (e.g., the agent application 110 of FIG. 1) running on the computing device, and a verification server 306 (e.g., the verification server 106 of FIG. 1).

Before the method 300 can be executed, the embedded key generator 302 has to be initialized. That is, an end-user is assumed to have already taken ownership of the embedded key generator 302 and established an owner authentication code. The agent application 304 is assumed to have access to the owner authentication code (e.g., provided by the end-user when the embedded key generator 302 is initialized). The illustration of FIG. 3 further assumes that the agent application 304 has network access to the verification server 306 at least for a portion of time during the execution of the method 300.

The method 300 is illustrated as an example to acquire licensing rights in a trusted storage of a software licensing provider. However, the method 300 can equally apply to verification of other data in accordance with various embodiments. In this illustrated example of license verification, the end-user is assumed to have received an entitlement ID from an independent software or service vendor.

The method 300 begins with the agent application 304 requesting a key generator certificate (e.g., the key generator certificate 208 of FIG. 2) based on the owner authentication code in step 312. That is, the agent application 304 can send a message, including the owner authentication code, to the embedded key generator 302. Upon authenticating the owner authentication code, the embedded key generator 302 can return the key generator certificate to the agent application 304 in step 314.

To establish the licensing rights in trusted storage, the agent application 304 sends the key generator certificate along with a data source identifier, such as the entitlement ID, in an activation request to the verification server 306 over a network in step 316. The activation request can be sent over a secure transport protocol over the network. In response, the verification server 306 can store the key generator certificate associated with the data source identifier (e.g., such that the verification server 306 can later identify what is being stored in the trusted storage associated with the key generator certificate). In step 318, the verification server 306 can send back a fulfillment record ("FR") of license rights and an authenticator generation formula ("authAlg") for generating a key authenticator (e.g., the first key authenticator 226A of FIG. 2) in a payload message. The fulfillment record is an original licensing fulfillment sent from the verification server 306 in response to the agent application 304 activating an license entitlement (e.g., represented by the entitlement ID).

The payload message represents agent data that the verification server 306 intends for the agent application to safeguard. The payload message can also include the key generator certificate identifying the agent application 304. All the data in the payload message can be signed by a public key infrastructure (PKI) certificate ("GLS-Cert") of the verification server 306 (e.g., to authenticate the verification server 306's identity). The PKI certificate can be a global certificate (e.g., owned by the software licensing provider or an independent software vendor). The verification server 306 can ensure that the key generator certificate is bound to the data source identifier to prevent repudiation (i.e., to ensure non-repudiation).

The agent application 304 uses the authenticator generation formula assigned by the verification server 306 to calculate a first key authenticator ("keyAuth") in step 320. For example, the agent application 304 can use the key generator certificate as a parameter of the authenticator generation formula. In various embodiments, the first key authenticator is never saved directly, but instead is regenerated using the authenticator generation formula whenever it is needed. In step 322, the agent application 304 authorizes the embedded key generator 302 to create a first encryption key ("K1") using the first key authenticator created in step 320. In response, the embedded key generator 302 returns, in step 324, a first key handle ("$H_{K1}$") corresponding to the first encryption key to the agent application 304. The embedded key generator 302 can store the association between the first key handle and the first encryption key. The embedded key generator 302 can also store the association between the first key handle and/or the first encryption key and the first key authenticator.

Then in step 326, the agent application 304 requests the embedded key generator 302 to encrypt the payload message (e.g., a message including a fulfillment record, the key generator certificate, and the authenticator generation formula) received in step 318 via an encryption request. The encryption request further includes the first key handle that the agent application 304 received in step 324 and the first key authenticator created in step 320. In response to the encryption request, the embedded key generator 302 encrypts the payload message with the first encryption key and returns the encrypted payload message in step 328. The embedded key generator can identify the first encryption key based on the first key handle in the encryption request. The embedded key generator can authorize the use of the first encryption key based on the first key authenticator supplied in the same encryption request.

Once the agent application 304 receives the encrypted payload message, the agent application 304 stores the encrypted payload message in the trusted storage in step 330. In the illustrated example, the fulfillment record is data that the agent application 304 is protecting against exploits by end-users operating the computing device. However, this disclosure contemplates other data that the agent application 304 can protect, including inventory data, user activity data, virtual currency, and etc. The authenticator generation formula and the first key handle associated with the first encryption key can also be stored in the trusted storage. Storing of the authenticator generation formula enables the agent application 304 to later regenerate the first key authenticator. By regenerating the first key authenticator and referencing the first key handle, the agent application 304 can thus request the embedded key generator 302 to decrypt the encrypted payload message at any time. Decryption of the encrypted payload message is further illustrated in FIG. 4.

Figure 4:
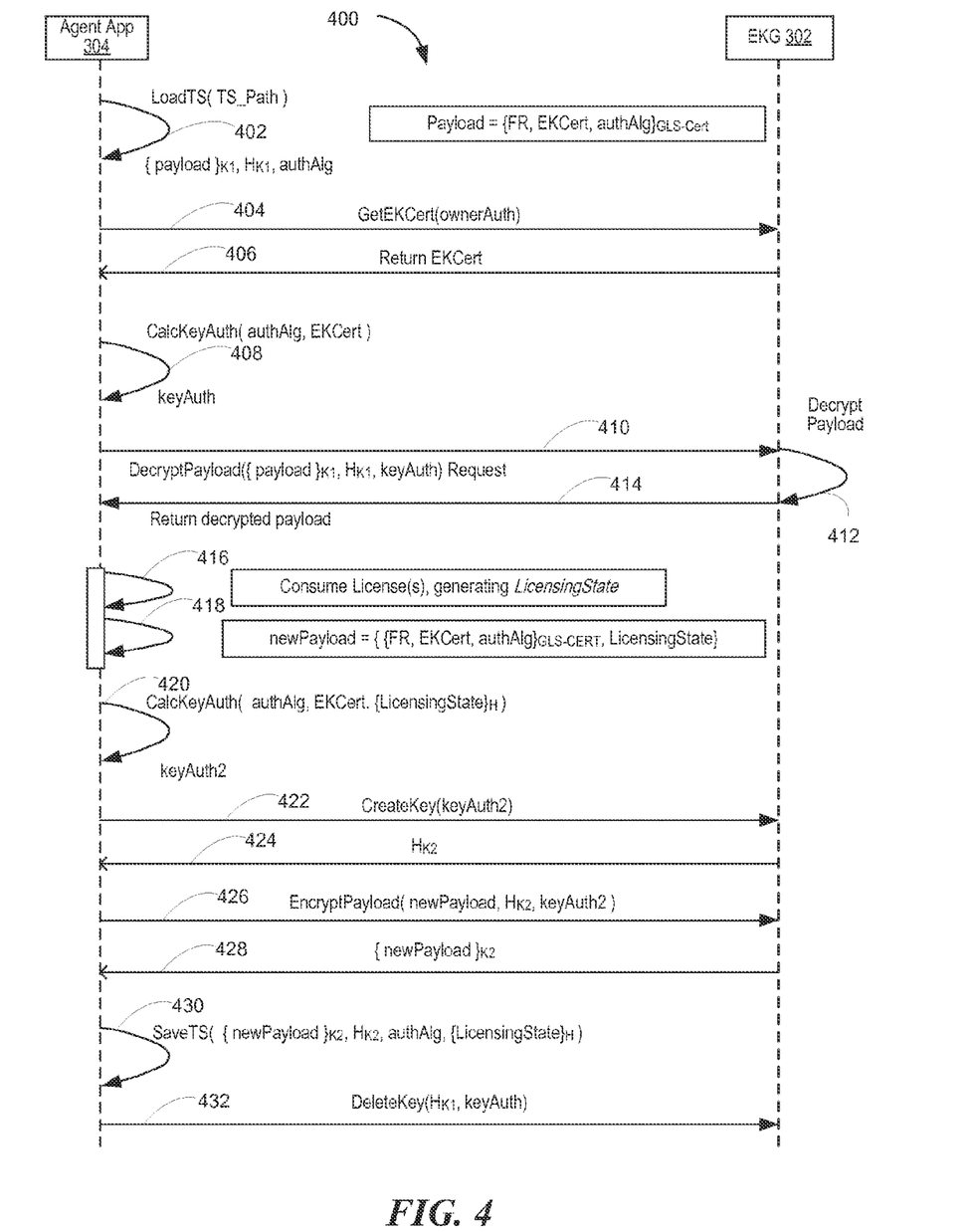
FIG. 4 is an activity diagram illustrating a method of modifying the trusted storage of FIG. 3 in the computing device, in accordance with various embodiments.

FIG. 4 is an activity diagram illustrating a method 400 of modifying the trusted storage of FIG. 3 in the computing device, in accordance with various embodiments. The method 400 involves the embedded key generator 302 of FIG. 3 and the agent application 304 of FIG. 3. The method 400 begins with the agent application 304 loading the trusted storage in step 402. For example, the agent application 304 can request access to the trusted storage via an operating system of the computing device by providing a filesystem path ("TS_Path"). The agent application 304 can load the trusted storage to retrieve an encrypted payload dataset (e.g., the encrypted payload message described in FIG. 3 that includes a fulfillment record, a key generator certificate and an authenticator generation formula that are digitally signed by a PSI certificate of the verification server 306 and encrypted with a first encryption key), a key handle associated with the payload dataset, and the authenticator generation formula associated with the encrypted payload dataset.

Then in step 404, the agent application 304 sends a certification request to the embedded key generator 302. The certification request can include an owner authentication code to verify that the agent application 304 is an owner of the computing device that the embedded key generator 302 is in or is attached to. In response to the certification request, the embedded key generator 302 returns a key generator certificate to the agent application 304 in step 406. The agent application 304 calculates the first key authenticator based on the authenticator generation formula and the key generator certificate in step 408 (e.g., same as step 320).

While the agent application 304 has no access to the first encryption key associated with the encrypted payload dataset, the agent application 304 can request, in step 410, the embedded key generator 302 to decrypt the encrypted payload dataset by providing the encrypted payload dataset, the first key handle, and the first key authenticator calculated in step 408. In response to the decryption request, the embedded key generator 302 can verify the first key authenticator associated with the first key handle, retrieve the first encryption key, and decrypt the encrypted payload dataset using the first encryption key in step 412. In step 414, the embedded key generator 302 returns the decrypted payload dataset to the agent application 304. The decrypted payload dataset includes an unencrypted fulfillment record that the agent application 304 can then read and modify.

Whenever the agent application 304 consumes licenses from the fulfillment record or otherwise needs to modify the trusted storage, the agent application 304 generates, in step 416, a new state (e.g., new licensing state) that needs to be persisted back into the trusted storage. For example, a licensing state is a transient state of accounting, saved to the trusted storage, of how many licenses are used by end-users. The licensing state can keep a record of the number of metered licenses that have been consumed and/or the last-access-time of the trusted storage.

After the agent application 304 generates the new state, the agent application 304 generates, in step 418, a new payload message based on the decrypted payload dataset retrieved in step 414 and the new state. For example, the new payload message can be a combination of the new state and the decrypted payload dataset.

In order to protect the new payload message each time the trusted storage is updated, the agent application 304 calculates, in step 420, a second key authenticator ("keyAuth2") based on the authenticator generation formula using the key generator certificate and a hash of the new state ("$\{LicensingState\}_H$") as parameters to the authenticator generation formula. The agent application 304 sends the second key authenticator to the embedded key generator 302 in step 422. In response, the embedded key generator 302 generates a second encryption key ("K2") and a second key handle ("$H_{K2}$") associated with the second encryption key, and returns the second key handle to the agent application 304 in step 424. The embedded key generator 302 can save the association between the second encryption key and the second key handle. The embedded key generator 302 can also save the association between the second encryption key and/or key handle and the second key authenticator.

With the second key handle, the agent application 304 sends an encryption request to the embedded key generator 302 to encrypt the new payload message in step 426. The encryption request can include the new payload message, the second key handle and the second key authenticator. In response to the encryption request, the embedded key generator 302 encrypts the new payload message with the second encryption key and returns the encrypted new payload message to the agent application 304 in step 428. The encrypted new payload message is stored in the trusted storage in step 430. The agent application 304 can further associate the second key handle, the authenticator generation formula, and the hash of the new state with the encrypted new payload message in the trusted storage. Once the encrypted new payload message is securely saved in the trusted storage, the agent application 304 can instruct the embedded key generator 302 to delete the first encryption key in step 432, thus cryptographically deleting the original payload dataset from the computing device that the trusted storage is on.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 5A:
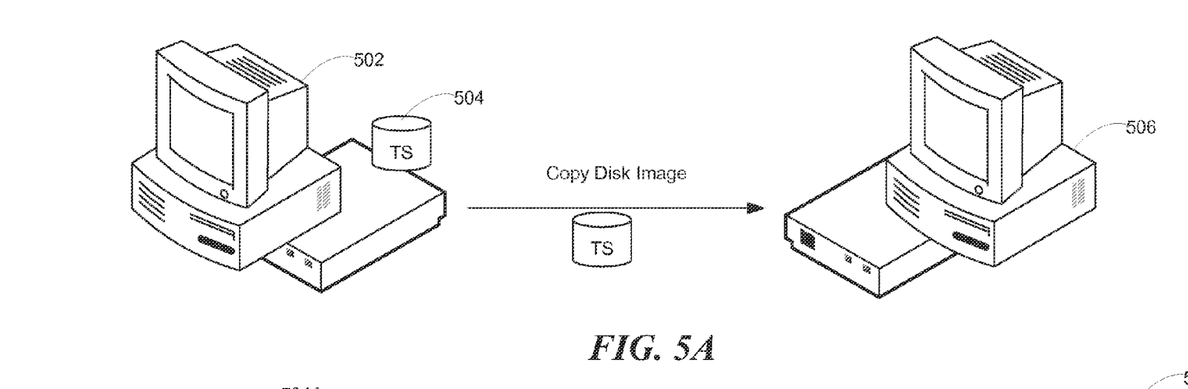
FIG. 5A is a block diagram illustrating a cloning exploit against a trusted storage.

FIG. 5A is a block diagram illustrating a cloning exploit against a trusted storage. Embodiments in this disclosure can prevent at least three different kinds of exploits against a trusted storage on a computing device external to a principal server of the trusted storage. For example, one of the potential reasons that the principal server maintains instances of the trusted storage on different computing devices is to determine whether to grant end-users of the computing devices access to particular privileges (e.g., computing services, electronic data, device functionalities, etc.). One way for an end-user to gain unauthorized access to the particular privileges without the principal server's approval is to copy a first instance of a trusted storage 504 from a first computing device 502 to a second computing device 506. This method of copying the trusted storage 504 is considered a "cloning exploit."

Traditionally, cloning exploits would be avoided by binding the first instance of the trusted storage 504 to a hardware fingerprint of the first computing device 502. For example, an agent application running on the first computing device 502 for the principal server can bind the first instance to a network card number (e.g., media access control (MAC) address) of the first computing device 502. However, some devices do experience legitimate hardware upgrades and changes (e.g., changing a network card on a desktop computer or upgrading a memory module).

At least some embodiments of the disclosed techniques are advantageous because each computing device can be associated with and identified by an embedded key generator via the key generator certificate. The required owner authentication code further ensures that there is a one-to-one mapping between each computing device implementing each instance of the trusted storage 504. The trusted storage 504 can only be decrypted by the embedded key generator embedded in a single device. Because the trusted storage 504 cannot be decrypted by anything other than on the embedded key generator, any clone of the trusted storage would be useless because of an exploiter's inability to decrypt.

Figure 5B:
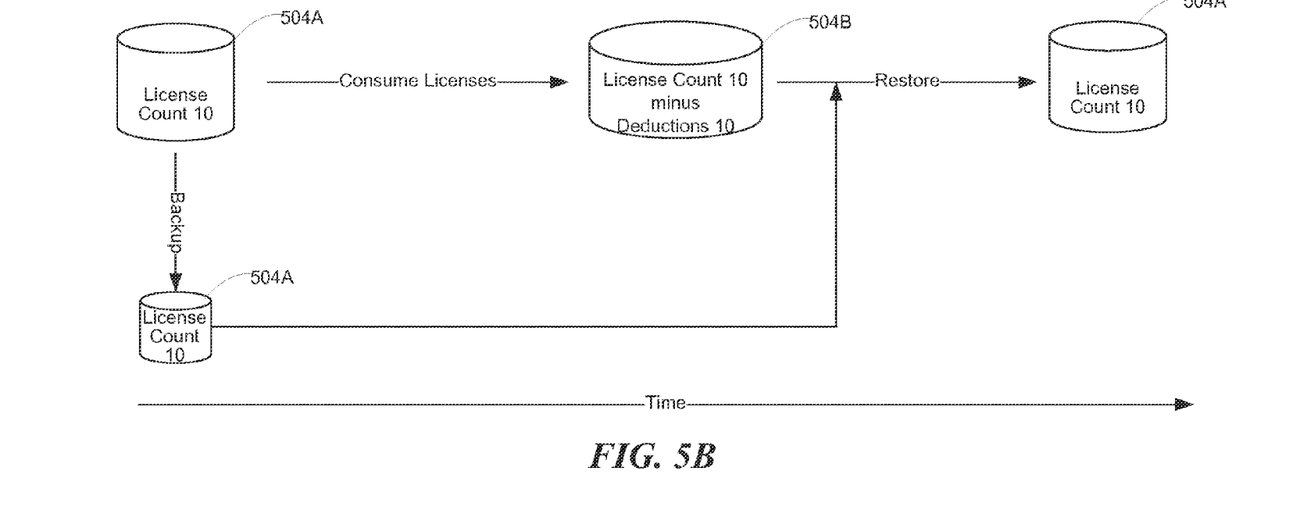
FIG. 5B is a block diagram illustrating a restoration exploit against a trusted storage.

FIG. 5B is a block diagram illustrating a restoration exploit against a trusted storage. An end-user of a computing device can also gain unauthorized access to the privileges without the principal server's authorization through a restoration exploit. For example, the trusted storage (e.g., shown as a first time instance 504A that updates to a later time instance 504B) can maintain an accounting of a limited quantity (e.g., renewable or otherwise) of licenses that enables the end-user to enjoy the privileges gate-kept by the principal server and its agent application. Each time an end-user consumes a license, the trusted storage is modified to update the accounting as illustrated by changes between the first time instance 504A and the later time instance 504B. The end-user can back-up the first time instance 504A of the trusted storage when the limited quantity of licenses is plentiful, such that at a later time when the licenses run out, the end-user can replace the later time instance 504B of the trusted storage 504 with the backed-up copy of the first time instance 504A to regain consumed licenses.

Traditionally, agent applications maintaining trusted storages attempt to avoid restoration via anchors. To detect restoration and deletion of a trusted storage, each version of the trusted storage can be paired with an anchor, using a sequence number stored in both trusted storage and the anchor. The anchor is a small piece of data (e.g., a sequence number) which refers to the version of the trusted storage and is hidden from users. If the agent application finds the anchor's sequence number is larger than that in trusted storage, the agent application would determine that the anchor is broken, and that trusted storage has been restored to an earlier version. However, in practice many situations may occur where an agent application may determine that an anchor is broken when in fact it should not have. Hence, use of anchors are prone to false positives when detecting restoration exploits.

At least some embodiments of the disclosed techniques can prevent restoration exploits without exposing the agent applications of the trusted storages to false positive detections. For example, step 432 of FIG. 4 cryptographically prevents any backup of the trusted storage to be restored by re-encrypting the trusted storage with a new, different key every time the trusted storage is updated and deleting any older keys that can decrypt older versions of the trusted storage. Because the re-encrypting and the deleting are part of any update transaction, this feature advantageously prevents a restoration exploit even if a backup copy of the trusted storage is made. As in the clone exploit, a backup copy of the trusted storage would not be accessible unless a decryption key is available.

Figure 5C:
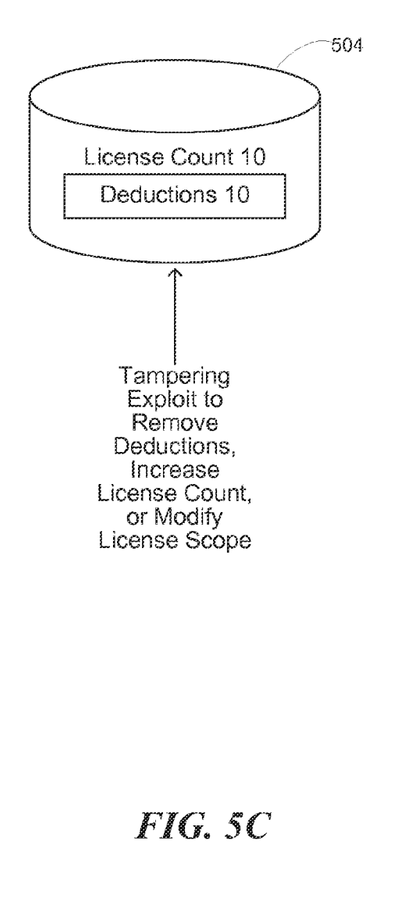
FIG. 5C is a block diagram illustrating a tampering exploit against a trusted storage.

FIG. 5C is a block diagram illustrating a tampering exploit against a trusted storage. An end-user of a computing device can also gain unauthorized access to the privileges without the principal server's authorization through a tampering exploit. As in the example above, the trusted storage 504 can maintain an accounting of a limited quantity of licenses that enables the end-user to enjoy the privileges gate-kept by the principal server and its agent application. For example, the trusted storage 504 can maintain fixed, static license, as received from a global license server. Each time an end-user consumes a license, the trusted storage is modified to update the accounting. However, the end-user can tamper with the accounting within the trusted storage 504 (e.g., modifying updates to the record) or by changing the scope of the privileges.

Tampering may be prevented by encrypting the trusted storage with a key generated and maintained by the principal server. However, this type of key management requires that the computing device having network access to the principal server every time the trusted storage is to be updated.

At least some embodiments of the disclosed techniques can prevent tampering exploits without requiring network access to the principal server every time the trusted storage 504 is to be updated. Because the trusted storage 504 is encrypted by the embedded key generator, and the authorization for decrypting the trusted storage 504 can only be obtained indirectly via a formula known by the principal server and its agent application running on the computing device, the end-user is prevented from decrypting the trusted storage 504 and from tampering with the data (e.g., licenses) therein.

Some embodiments further prevent tampering by the disclosed feature of changing the key authenticator every time the trusted storage is updated. An end-user can attempt to determine a key authenticator in order to tamper with the trusted storage 504. However, an end-user's ability to use the stolen key authenticator is hampered by the changing of the key authenticator each time the trusted storage 504 is updated (e.g., in step 420).

Various embodiments provide a solution to utilize a secure, local hardware cooperating with a local agent application to manage a trusted storage in a hostile computing device. These embodiments allow both long-term persistence of encryption keys and a guarantee that encryption keys generated are unique on each machine and protected from extraction.

Figure 6:
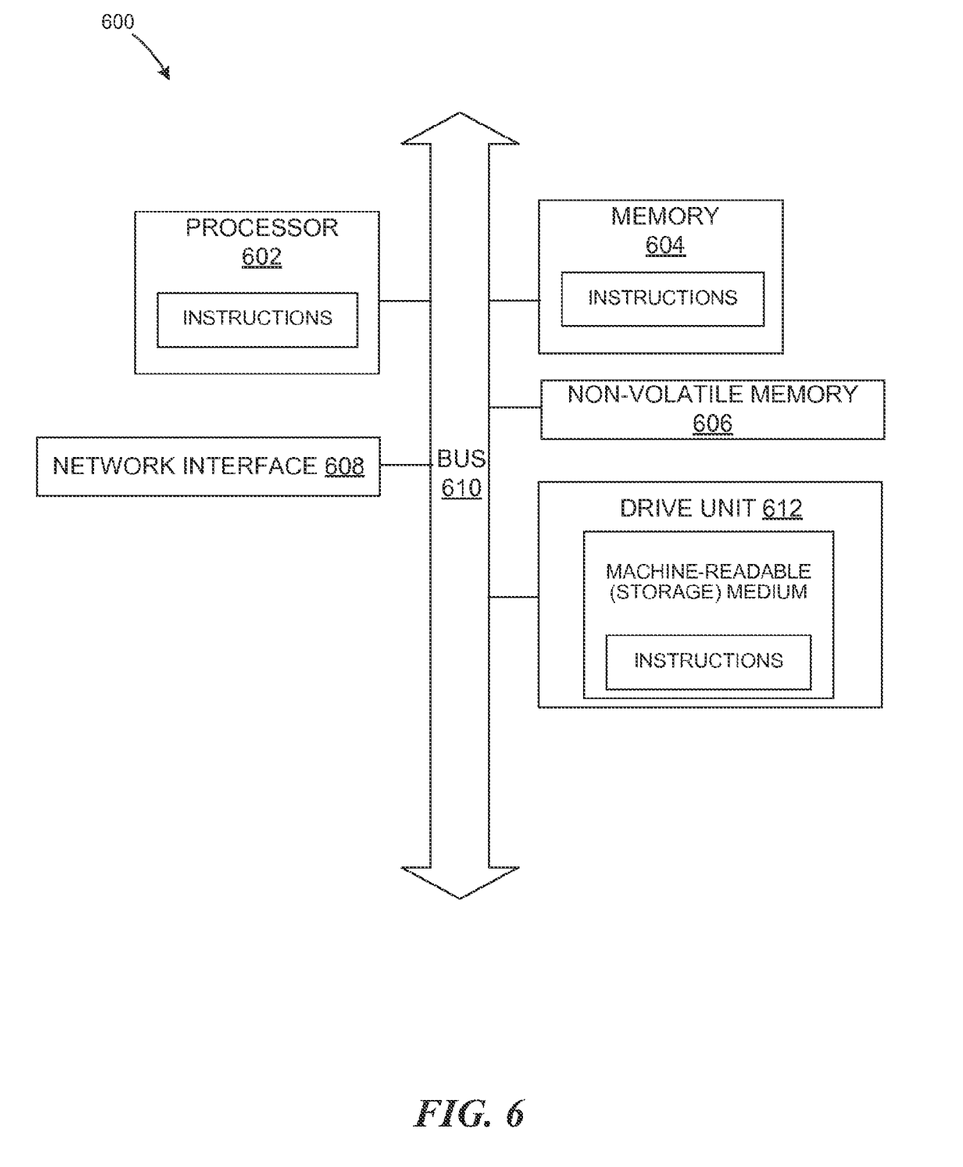
FIG. 6 is a diagrammatic representation of a machine in the example form of a computer system within which a set of instructions, for causing the machine to perform any one or more of the methodologies or modules discussed herein, may be executed.

FIG. 6 is a block schematic diagram that depicts a machine in the exemplary form of a computer system 600, within which a set of instructions for causing the machine to perform any of the herein disclosed methodologies (e.g., FIGS. 3-4) may be executed. For example, the computer system 600 can be the computing devices 104 or the verification server 106 of FIG. 1 or the verification server 306 of FIG. 3. In some embodiments, the computer system 600 may include a network router, a network switch, a network bridge, personal digital assistant (PDA), a cellular telephone, a Web appliance or any machine capable of executing or transmitting a sequence of instructions that specify actions to be taken. The computer system 600 is intended to illustrate a hardware device on which any of the instructions, processes, modules and components depicted in the figures above (and any other processes, techniques, modules and/or components described in this specification) can be implemented. As shown, the computer system 600 includes a processor 602, memory 604, non-volatile memory 606, and a network interface 608. Various common components (e.g., cache memory) are omitted for illustrative simplicity. The computer system 600 can be of any applicable known or convenient type, e.g., a personal computer (PC), server-class computer or mobile device (e.g., smartphone, card reader, tablet computer, etc.). The components of the computer system 600 can be coupled together via a bus and/or through any other known or convenient form(s) of interconnect(s).

One of ordinary skill in the relevant art will recognize that the terms "machine-readable (storage) medium" or "computer-readable (storage) medium" include any type of device that is accessible by the processor 602. The memory 604 is coupled to the processor 602 by, for example, a bus 610. The memory 604 can include, by way of example but not limitation, random access memory (RAM), e.g., dynamic RAM (DRAM) and static RAM (SRAM). The memory 604 can be local, remote, or distributed.

The bus 610 also couples the processor 602 to the non-volatile memory 606 and drive unit 612. The non-volatile memory 606 may be a hard disk, a magnetic-optical disk, an optical disk, a read-only memory (ROM), e.g., a CD-ROM, Erasable Programmable Read-Only Memory (EPROM), or Electrically Erasable Programmable Read-Only Memory (EEPROM), a magnetic or optical card, or another form of storage for large amounts of data. The non-volatile memory 606 can be local, remote, or distributed.

The data structures, modules, and instruction steps described in the figures above may be stored in the non-volatile memory 606, the drive unit 612, or the memory 604. The processor 602 may execute one or more of the modules stored in the memory components.

The bus 610 also couples the processor 602 to the network interface 608. The network interface 608 can include one or more of a modem or network interface. A modem or network interface can be considered to be part of the computer system 600. The network interface 608 can include an Ethernet card, a Bluetooth card, an optical fiber interface, a cable modem, a token ring interface, or other interfaces for coupling a computer system to other computer systems.

It is to be understood that embodiments may be used as or to support software programs or software modules executed upon some form of processing core (e.g., the CPU of a computer) or otherwise implemented or realized upon or within a machine or computer readable medium. A machine-readable medium includes any mechanism for storing or transmitting information in a form readable by a machine, e.g., a computer.

For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Some embodiments of the disclosure have other aspects, elements, features, and steps in addition to or in place of what is described above. These potential additions and replacements are described throughout the rest of the specification.

What is claimed is:

1. A computer-implemented method of maintaining a trusted storage via a licensed application in a computing device on behalf of a global license server, comprising:
   retrieving a key generator certificate from an embedded key generator, wherein the embedded key generator is a hardware component embedded in the computing device separate from a processor of the computing device that executes the licensed application;
   requesting the embedded key generator to generate a first encryption key associated with a first key authenticator and to return a first key handle associated with the first encryption key;
   generating an encryption request to send to the embedded key generator, the encryption request including the first key handle, the first key authenticator, and a fulfillment record to be maintained in the trusted storage of the computing device; and
   in response to receiving an encrypted fulfillment record from the embedded key generator, storing the encrypted fulfillment record in the trusted storage, wherein the encrypted fulfillment record is encrypted via the first encryption key.

2. The computer-implemented method of claim 1, further comprising:
   receiving the fulfillment record and an authenticator generation formula associated with the fulfillment record from the global license server.

3. The computer-implemented method of claim 2, further comprising:
   calculating the first key authenticator using the authenticator generation formula provided by the global license server based on the key generator certificate.

4. The computer-implemented method of claim 2, further comprising:
   sending an activation request to the global license server, wherein the activation request includes the key generator certificate;
   wherein the fulfillment record and the authenticator generation formula are received as a response to the record activation request.

5. The computer-implemented method of claim 4, wherein the activation request is a request to activate one or more licenses, the activation request including an entitlement identifier from a software or service vendor; and wherein the fulfillment record is a fulfillment record of the licenses.

6. The computer-implemented method of claim 2, wherein receiving the fulfillment record and the authenticator generation formula is part of receiving a payload message including the fulfillment record, the authenticator generator formula, and the key generator certificate from the global license server.

7. The computer-implemented method of claim 6, wherein the payload message is digitally signed by the global license server.

8. The computer-implemented method of claim 1, wherein retrieving the key generator certificate is by sending an authentication request based an owner authentication code that is established when the computing device first initiated the embedded key generator.

9. A computer-implemented method of securely modifying a trusted storage via an agent application in a computing device, comprising:
   maintaining the trusted storage in the computing device, wherein the trusted storage stores an encrypted agent record associated with a first key handle and an authenticator generation formula, and wherein the encrypted agent record is maintained by the agent application in the computing device on behalf of a verification server external to the computing device;
   requesting an embedded key generator to decrypt the encrypted agent record by referencing the first key handle and authenticating with a first key authenticator calculated based on the authenticator generation formula, wherein the embedded key generator is a hardware component embedded in the computing device separate from a processor of the computing device that executes the agent application;
   requesting the embedded key generator to generate a second encryption key associated with a second key authenticator and to return a second key handle associated with the second encryption key;
   generating an encryption request to send to the embedded key generator to encrypt a payload message including a record update of the decrypted agent record and the decrypted agent record; and
   commanding the embedded key generator to delete a first encryption key that was used to encrypt the encrypted agent record by referencing the first key handle and authenticating with the first key authenticator.

10. The computer-implemented method of claim 9, wherein the decrypted agent record represents a digital policy governing computing activities of an end-user of the computing device or device usage data associated with a computing activity monitored by the agent application for the verification server.

11. The computer-implemented method of claim 9, wherein the encryption request includes the second key handle, the second key authenticator, and the payload message.

12. The computer-implemented method of claim 9, wherein the decrypted agent record is digitally signed by the verification server.

13. The computer-implemented method of claim 9, further comprising:
   receiving an encrypted response from the embedded key generator, wherein the encrypted response is responsive to the encryption request; and
   storing the encrypted response in the trusted storage.

14. The computer-implemented method of claim 9, further comprising:
   retrieving a key generator certificate from the embedded key generator based on an owner authentication code available to the agent application; and
   calculating the first authenticator key based on the authenticator generation formula with the key generator certificate as a parameter.

15. The computer-implemented method of claim 14, further comprising:
   calculating a hash value based on the record update; and calculating the second authenticator key based on the authenticator generation formula with the key generator certificate and the hash value as parameters.

16. The computer-implemented method of claim 9, wherein the verification server is a global license server; wherein the decrypted agent record includes a fulfillment record; and wherein the record update includes a licensing state update that accounts for consumption of one or more licenses within the fulfillment record.

17. A computing device comprising:
   a processor;
   an embedded key generator that is a hardware component separate from the processor;
   a memory storing executable instructions implementing an agent application module, wherein the memory includes a trusted storage space;
   wherein the agent application module, when executed by the processor, is operable to maintain the trusted storage space for a verification computer server by:
      retrieving a key generator certificate from the embedded key generator;
      requesting the embedded key generator to generate a first encryption key associated with a first key authenticator and to return a first key handle associated with the first encryption key;
      generating a first encryption request to send to the embedded key generator, the first encryption request including the first key handle, the first key authenticator, and an agent record to be maintained in the trusted storage space; and
      in response to receiving an encrypted agent record from the embedded key generator, storing the encrypted agent record associated with the first key handle and an authenticator generation formula in the trusted storage space, wherein the encrypted agent record is encrypted via the first encryption key.

18. The computing device of claim 17, wherein the agent record represents a digital policy governing an end-user of the computing device or device usage data associated with a computing activity monitored by the agent application module for the verification computer server.

19. The computing device of claim 17, wherein the verification computer server is a global license server; wherein the agent record includes a fulfillment record of one or more licenses.

20. The computing device of claim 17, wherein the agent application module, when executed by the processor, is further operable to:
   request the embedded key generator to decrypt the encrypted agent record by referencing the first key handle and authenticating with the first key authenticator calculated based on the authenticator generation formula;
   request an embedded key generator to generate a second encryption key associated with a second key authenticator and to return a second key handle associated with the second encryption key, wherein the second key authenticator is calculated based on the authenticator generation formula;
   generate a second encryption request to send to the embedded key generator to encrypt a payload message including a record update of the decrypted agent record and the decrypted agent record; and
   command the embedded key generator to delete the first encryption key by referencing the first key handle and authenticating with the first key authenticator.

* * * * *